UNITED STATES PATENT OFFICE.

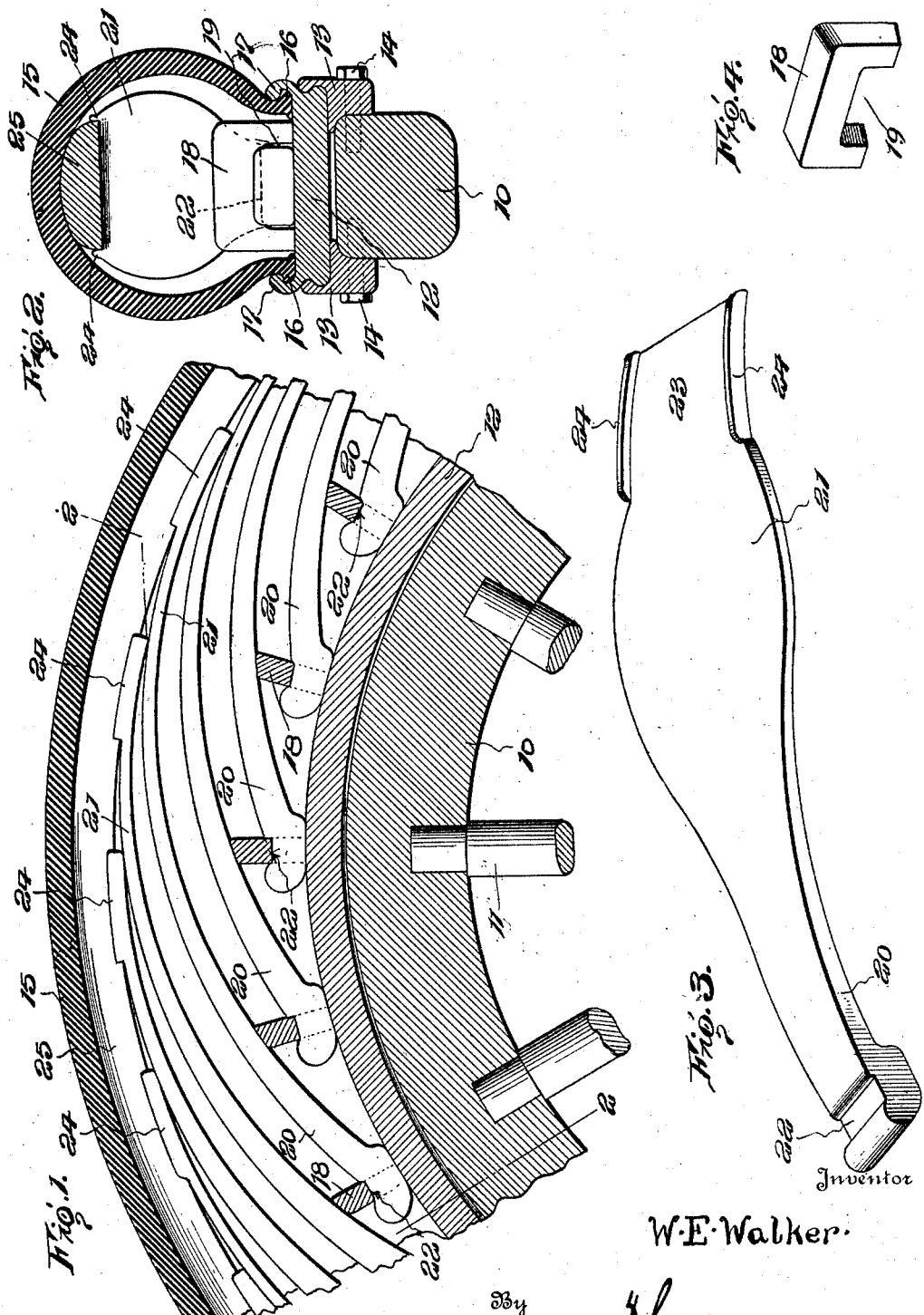

WILLIAM E. WALKER, OF COTTAGE GROVE, OREGON.

CUSHION-TIRE.

1,315,062.

Specification of Letters Patent.

Patented Sept. 2, 1919.

Application filed July 27, 1916, Serial No. 111,667. Renewed January 23, 1919. Serial No. 272,784.

*To all whom it may concern:*

Be it known that I, WILLIAM E. WALKER, a citizen of the United States, residing at Cottage Grove, in the county of Lane and State of Oregon, have invented certain new and useful Improvements in Cushion-Tires, of which the following is a specification.

This invention relates to improvements in tires of automobiles and like vehicles, and has for one of its objects to provide a yieldable support for the tire casing which embodies all of the advantages of the pneumatic tire without the danger of puncturing the same.

Another object of the invention is to provide a device of this character constructed of a plurality of coacting units including springs and supporting devices which effectually support the springs and prevent their displacement, when in use.

With these and other objects in view, the invention consists in certain novel features of construction as hereinafter shown and described and then particularly pointed out in the claims; and in the drawings illustrative of the preferred embodiment of the invention, Figure 1 is a longitudinal sectional view of a portion of a wheel rim and tire casing with a plurality of yieldable members and holding members arranged within the casings;

Fig. 2 is a transverse section taken on the line 2—2 of Fig. 1;

Fig. 3 is a detached perspective view of one of the yieldable members;

Fig. 4 is a detached perspective view of one of the holding members.

The improved device may be applied without any material structural change to the tire casings and rims of any of the various forms of automobile wheels, and for the purpose of illustration is shown thus applied, a portion of the felly of the wheel being represented at 10, portions of the spokes at 11, and the rim at 12, the latter being held in position upon the felly by suitable clips 13 and clamp bolts 14. The tire casing is indicated as a whole at 15 and is provided with beads 16 engaged by the clencher flanges 17 of the rim. Located within the casing 15 and bearing upon the rim 12, are holding devices each comprising a body portion 18 having a recess or seat cavity 19 in the lower edge the ends of each recess forming abutments or stops. Any required number of the holding members 18 may be employed, and it is not desired to limit the invention to any specific number. A plurality of yieldable members or springs, corresponding in number to the holding members, are provided and each formed relatively narrow and thick near one end, as illustrated at 20 in Fig. 3, and increased in width and decreased in thickness toward the opposite end, as represented at 21. The thicker narrower portion of each of the yieldable members is provided with a transverse recess or seat 22. At the end opposite to its seat 22, the spring member is slightly reduced, as shown at 23, and the sides extended for a distance in parallel relation and the parallel portions formed into stop ribs 24. A continuous annular tire supporting member 25 extends around the interior of the casing 15 and corresponds in width to the distance between the ribs 24. Each of the spring members 20—21 is engaged by its seat 22 with the recess 19 of one of the members 18, while the reduced portion 23 bears against the inner face of the tire supporting member 25 with the stop ribs 24 engaging against the sides of the same, as shown. The material of the holding members at the ends of the recesses operate to confine the recessed ends of the yieldable members and prevent lateral displacement. The spring members, it will be noted by reference to Fig. 1, overlap each other for the major portions of their lengths and each spring member bears over the outer edge of the next member 18 in advance. The members 18 thus perform the two-fold function of a means for locking the thicker narrower ends of the spring members in position from either circumferential or lateral movement and, at the same time, engage the spring members intermediate their ends and firmly support and lock them in position. Thus, when the spring members and holding members are arranged in continuous relation around the interior of the casing, they are firmly locked together and all displacement in any direction effectually prevented, while, at the same time, the resilient action of the spring members is exerted to retain the casing in its expanded position and produce the requisite spring action.

The spring members may be constructed in quantities and precisely alike and are thus interchangeable and readily renewable when broken or impaired, while the members 18 are likewise exactly alike and may be manufactured in large quantities and are interchangeable.

The improved device is simple in construction, may be inexpensively manufactured, and operates effectually for the purposes described.

Having thus described the invention, what is claimed as new is:

1. A yieldable tire casing support comprising a continuous supporting member adapted to be located within a tire casing, a plurality of holding members spaced apart and adapted to bear upon a wheel rim within the tire casing, and each formed with an external seat and a transverse recess extending entirely therethrough, a plurality of resilient members each adapted to bear at one end against the continuous supporting member and extending at the other end through the transverse recess of one of the holding members and prevented from lateral displacement by the material at the ends of the same, each resilient member having a seat to receive the holding member and bearing intermediate its ends upon the external seat of the next holding member in advance.

2. A yieldable tire casing support comprising a continuous supporting member adapted to be located within the tire casing, a plurality of holding members spaced apart and adapted to bear upon the wheel rim within the tire casing and each formed with an external seat and a transverse recess extending entirely therethrough, a plurality of resilient members each increased in thickness and decreased in width at one end and with a transverse recess in the thicker end whereby stop shoulders are produced at each side of the recess, each of said resilient members adapted to bear at one end against the continuous supporting member and extending at the other end through the transverse recess of one of the holding members and prevented from lateral displacement by the material at the ends of the same, and from longitudinal displacement by the stop shoulders, each resilient member bearing intermediate its ends upon the external seat of the next holding member in advance.

In testimony whereof I affix my signature.

WILLIAM E. WALKER. [L. S.]

Copies of this patent may be obtained for five cents each, by addressing the "Commissioner of Patents, Washington, D. C."